May 20, 1969     F. L. BISHOP     3,445,212
METHOD OF SEALING COPPER IN SILICA BODY
Filed June 14, 1966
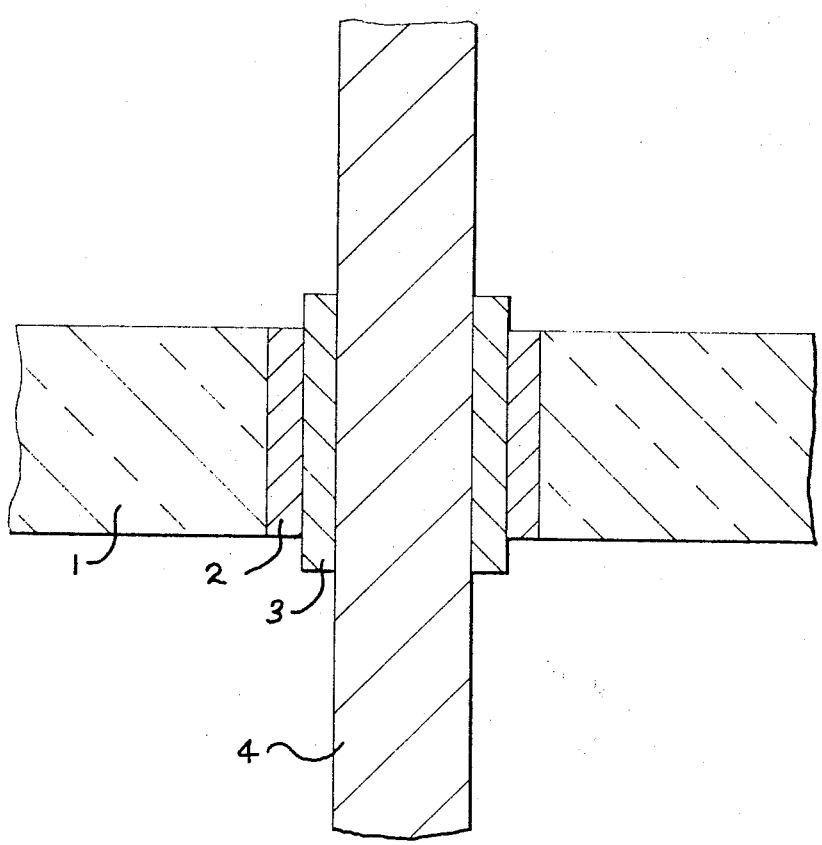
INVENTOR.
FREDERIC L. BISHOP
BY Paul L. Sabatine
W. A. Schaich
ATTORNEYS

United States Patent Office 3,445,212
Patented May 20, 1969

3,445,212
**METHOD OF SEALING COPPER
IN SILICA BODY**
Frederic L. Bishop, Toledo, Ohio, assignor to Owens-
Illinois, Inc., a corporation of Ohio
Filed June 14, 1966, Ser. No. 557,486
Int. Cl. C03c *27/02*
U.S. Cl. 65—59                                8 Claims

ABSTRACT OF THE DISCLOSURE

A method of sealing a copper lead-in conductor to a surface of a low-expansion silica containing material using a reduced copper sealing glass.

---

The present invention relates to a method for making an article of commerce and, more particularly, to an article consisting of a metallic conductor intimately bonded to a low expansion surface. Specifically, the instant invention pertains to a process for making a composite article of manufacture comprising a metal lead-in wire, or a metal strip, or a metallic conductor or the like extending through the surface of a low expansion silica-containing material and said conducting means positionally fixed by a copper sleeve support and intimately bonded to a reduced vitreous solder glass composition.

Low expansion silica-containing materials conventionally include low expansion ceramics, fused quartz, and fused silica, and when used herein, fused quartz and fused silica are used as functionally equivalents. Low expansion materials, such as ceramics and quartz have been intimately associated with the growth of electricity from its beginning era. Ceramics are conventionally used for insulators, single and double throw switches, low voltage switches, and as an insulator in power transmission and communications. Ceramic materials are also used for the manufacture of electric equipment, in dielectric and ultra-high dielectric devices, in spark plug fabrication and the like. Ceramic-type materials, such as cordierite, because of its very low thermal expansion and consequent good thermal shock resistance is employed to make discrete forms for use in electric stove elements. Fused quartz and fused silica enjoy commercial application for spectrum tubes, tubular germicidal lamps, plates for frequency control and for various items of commerce.

In the manufacture of low expansion ceramics and fused silica items of commerce, it is often necessary to hermetically seal a metallic conductor which passes through the wall of the low expansion ceramic or fused silica to effect the desired item. In manufacture of the above-mentioned seals, technological difficulties are often encountered, for example the difficulties of sealing the solder glass to the low expansion surfaces, the difference of coefficients of expansion between the low expansion, grade seal, and lead-in conductor surfaces, seal hairline cracks, the difficulty in providing a particular glass to which the metallic conductor will firmly adhere, sealing failures due to vibration, and the encounterment of other fabrication and use problems. A critical need exists for an acceptable means for sealing pass-through conductors in the wall of low expansion surfaces. In view of the above, it will be appreciated by those versed in the instant art that a means for forming a composite article of manufacture comprising a metallic member which extends through a low expansion surface would have a definite economic use and would represent a substantial contribution to the art. Likewise, it will be further appreciated by those skilled in the art that an article of commence consisting of a lead-in wire, metal strip, or metallic conductor, or the like intimately bonded to a low expansion surface and essentially free from the tribulations associated with the prior art would increase the usefulness of said item in the electrical art.

Accordingly, it is an object of the present invention to provide a novel means for hermetically sealing a lead-in conductor to a surface of ceramic or fused quartz.

Another object of the present invention is to provide an article of manufacture consisting essentially of a lead-in conductor extending through and intimately joined to a low expansion surface.

Still a further object of the invention is to provide an improved ceramic or fused quartz-to-metal seal for electronic application.

Yet a further object of the invention is to provide a means for positioning a lead-in conductor through a low expansion surface with less strain or tension on the latter surface.

A still further object of the present invention is to provide a reduced copper surface on a low expansion silica-type surface to which a metal sleeve may be bonded.

A still further object of the present invention is to provide a reduced copper surface on a low expansion silica-type surface to which a copper sleeve may be bonded.

Yet a still further object of the present invention is to provide a reduced copper surface on a low expansion material to which a copper-containing sleeved lead-in conductor may be soldered or brazed.

These and other objects of this invention will become apparent from the following detailed description and claims.

In attaining the objects of this invention, a novel article of manufacture is fabricated by first joining a layer of a solder glass to the low expansion ceramic or fused quartz surface. The low expansion surfaces referred to herein are the commercially available low expansion ceramics, fused quartz and fused silica. Generally, the low expansion ceramics will have a coefficient of expansion of about $20 \times 10^{-7}/°$ C. (0–300° C.) or less. As examples of low expansion ceramic may be cited a ceramic composition comprising, in weight percent, 69% $SiO_2$, 19% $Al_2O_3$, 4% CaO, 3.8% $Li_2O$, 1.8% $TiO_2$, 2% $ZrO_2$, 0.1% $Na_2O$, and 0.3% $Sb_2O_3$ with a heat treatment period at 1375° for 480 hours with an expansion of $0.6 \times 10^{-7}/°$ C. (0.300° C.); a ceramic consisting essentially of 69.9% $SiO_2$, 18% $Al_2O_3$, 4% CaO, 4% $Li_2O$, 3.5% $ZrO_2$, 0.1% $Na_2O$, and 0.2% $Sb_2O_3$ with a thermal coefficient of $0.5 \times 10^{-7}/°$ C. (0–300° C.); and a composition consisting of 64.1% $SiO_2$, 20.9% $Al_2O_3$, 2.7% CaO, 3.7% $Li_2O$, 1.8% $TiO_2$, 2% $ZrO_2$, 0.5% $Na_2O$, 2.9% $B_2O_3$, 1.3% ZnO, and 0.1% $As_2O_3$ with an annealing point for the glass of 1225° F., a heat treating period of 64 hours at 1325° F. with a coefficient of expansion of $3.1 \times 10^{-7}/°$ C. (0–300° C.), the ceramics disclosed in Netherlands patent application No. 6,503,460, and other like low expansion ceramic compositions. The above-mentioned ceramics are cited as exemplary and are not to be construed as limiting, as other suitable materials known to those versed in the art may be used in the mode and manner of the instant invention.

According to the practice of the invention, a thin layer, about 0.1 to 0.3 inch, of a vitreous solder glass selected from the group of solder glasses consisting of 75 to 80 mole percent $SiO_2$, 8 to 12 mole percent $Al_2O_3$, 10 to 15 mole percent $Cu_2O$, and a glass consisting of 75 to 80 mole percent $SiO_2$, 8 to 12 mole percent $Al_2O_3$, 10 to 15 mole percent $Cu_2O$, and 1 to 3 mole percent $AlF_3$ is sealed to the surface of the low expansion ceramic or fused quartz surface. Examples of sealing glass employed herein are glasses of 77.5 mole percent $SiO_2$, 10 mole percent $Al_2O_3$, and 12.5 mole percent $Cu_2O$, and a glass consisting of 77.0 mole percent $SiO_2$, 9.25 mole percent $Al_2O_3$, 1.30 mole percent $AlF_3$, and 12.45 mole percent $Cu_2O$. The solder glass compositions reported herein were prepared from Kona Quintas quartz, Alcoa A-14 Alumina, $AlF_3$ and $Cu_2O$ to give the desired mole percent of $SiO_2$, $Al_2O_3$, $AlF_3$ and $Cu_2O$. The size of the melt was generally about 10 pounds, and the compositions were prepared by blending the batch ingredients, melting in a silica crucible at 1500 to 1600° C. for 15 to 16 hours in a gas fired furnace using a slight excess of oxygen.

In attaining the method of the invention, a vitreous solder glass of 77.5 mole percent $SiO_2$, 10 mole percent $Al_2O_3$, and 12.5 mole percent $Cu_2O$ is sealed to the surface of the ceramic or fused quartz surface. The solder glass may be applied in the conventional manner, such as bead or paste form. For example, the sealing glass listed immediately above, previously drawn into a fiber form, was applied to a low expansion ceramic surface by a hand torch equipped with a No. 3 tip and fueled by a mixture of gas and oxygen. Other seals were fabricated employing a hydrogen-oxygen flame. At no time was the quartz or ceramic surface heated hot enough to glaze the edge of the surface or to produce distortion of said surface. Next, the ceramic with the copper solder glass sealed thereto is subjected to a reduction process to produce an adherent copper metal layer on the free surface of the solder glass. The layer of copper is effected by first oxidizing the copper layer in an air atmosphere for about 10 minutes at 750° F. and then placing the piece in a hot furnace at 675° C. for 10 minutes with a hydrogen atmosphere. The reduced layer is then cooled in a hydrogen atmosphere to about 200° F. and then in air to room temperature. The reduced layer can alternatively be produced by heating the entire body to 1000° C. and immersing quickly in an organic oil such as corn oil for a short time.

The commercially-available metals that can be used as the metallic lead-in conductor are the alloys comprising nickel, cobalt, iron, manganese, tungsten, and the like. These alloys include the alloy "Kovar" consisting of about 29% nickel, 17% cobalt, 0.3% manganese, and the balance iron; Sylvania No. 4 alloy consisting of 42% nickel, 5.5% chromium and the balance iron; the alloy sold under the trade name "Fernico" consisting of 54% iron, 28% nickel, and 18% cobalt; and the alloy sold under the trade name "Dumet" containing 45% nickel and 55% iron, and like alloys.

Exemplary of other functionally equivalent lead-in conductors that may be employed with the spirit of the subject invention are copper lead-in conductors and copper coated lead-in conductors. A suitable copper coated lead-in conductor can be effected by coating commercially available lead-in conductors. The copper coating can be applied by standard techniques, such as the electrodeposition of copper, electroplating employing copper plating baths, and by metallic coating processes like dipping, spraying and vapor deposition.

The metal conductor, selected from the group of abovementioned conducting materials, is convenentionally clad with a thin sheath made of copper or a suitable copper alloy. Exemplary of copper alloys are the materials marketed as the brasses, tin bronzes, aluminum bronzes, nickel silvers, cupra-nickels, copper-zinc, copper-tin, and the like. This cladding or annular sheath affords a means for firmly joining the lead-in conductor to the free reduced copper solder glass surface. For example, a Kovar lead-in wire of about 0.002 inch in diameter is inserted into a copper sheath whose inside diameter corresponds to the outside diameter of said conductor. The annular sheath is held in place by soldering or brazing the sheath to the conductor, or the annular sheath may be soldered at its end through which the conductor extends, or other techniques may be employed such as pinching the ends of the annular sheath, or electroplating the conductor. The lead-in conductor soldered to the copper sleeve is then intimately joined to the reduced surface of the solder glass that has been previously intimately bonded to the low expansion ceramic or quartz surfaces described supra. This can be done by brazing or soldering.

Thus, in accordance with the foregoing description, this invention provides a novel means for sealing a lead-in conductor to a low expansion silica-containing material. The lead-in conductor itself may be copper, a copper alloy or other suitable conductors, including copper and copper alloys, having a copper or copper alloy casing, sleeve, sheath or coating and the term "copper lead-in conductor" is intended to include lead-in conductors of the foregoing types.

An embodiment of this invention is illustrated in the accompanying drawings. In the drawings, the low expansion ceramic 1 has intimately soldered thereto a reduced copper solder glass 2. The lead-in wire 4 is clad to a copper sleeve 3 which is brazed to the reduced solder glass 2.

While the illustrative embodiments of the invention have been described with particularity, it will be understood that various modifications will be apparent and can readily be made by those skilled in the art without departing from the scope and spirit of the invention.

I claim:
1. A method for forming a seal between a copper lead-in conductor and the surface of a low-expansion silica containing material which comprises bonding a cuprous oxide containing silica sealing glass to the surface of said low-expansion silica containing material, said glass containing about 10–15 mole percent cuprous oxide, reducing the free surface of said couprous oxide containing silica sealing glass and joining said copper lead-in conductor to said reduced surface.

2. The method of claim 1 wherein said cuprous oxide containing silica sealing glass is a glass selected from the group of glasses consisting essentially of 75 to 80 mole percent $SiO_2$, 8 to 12 mole percent $Al_2O_3$, and 10 to 15 mole percent $Cu_2O$, and a glass consisting of 75 to 80 mole percent $SiO_2$, 8 to 12 mole percent $Al_2O_3$, 10 to 15 mole percent $Cu_2O$, and 1 to 3 mole percent $AlF_3$.

3. The method of claim 2 wherein the sealing glass consists of about 77.5 mole percent $SiO_2$, 10 mole percent $Al_2O_3$, and 12.5 mole percent $Cu_2O$.

4. The method of claim 2 wherein the sealing glass consists of about 77 mole percent $SiO_2$, 9.25 mole percent $Al_2O_3$, 12.45 mole percent $Cu_2O$, and 1.30 mole percent $AlF_3$.

5. The method of claim 2 wherein the step of reducing the free surface of said cuprous oxide containing silica sealing glass comprises the step of subjecting the free surface to a reducing environment.

6. The method of claim 5 wherein said reducing environment is a hydrogen atmosphere.

7. The method of claim 2 wherein said reducing step comprises the steps of heating said free surface in an oxidizing atmosphere, then subjecting said free surface to a reducing environment.

8. The method of claim 7 wherein the step of subjecting said free surface to a reducing environment comprises the step of immersing said free surface in an organic oil.

References Cited

FOREIGN PATENTS 239,871 11/1926 Great Britain.
648,239 1/1951 Great Britain.

DONALL H. SYLVESTER, *Primary Examiner.*

R. V. FISHER, *Assistant Examiner.*

U.S. Cl. X.R.

29—473.1; 106—52; 161—196